(12) United States Patent
Hystad

(10) Patent No.: US 6,446,568 B1
(45) Date of Patent: *Sep. 10, 2002

(54) STOPPING AND RETAINING DEVICE FOR CHAIN OR WIRE

(75) Inventor: Per Hystad, deceased, late of Kopervik (NO), by Serina Hystad, heiress

(73) Assignee: Karmoy Winch A/S, Kopervik (NO)

( * ) Notice: Subject to any disclaimer, the term of this patent is extended or adjusted under 35 U.S.C. 154(b) by 0 days.

This patent is subject to a terminal disclaimer.

(21) Appl. No.: 09/469,283

(22) Filed: Dec. 22, 1999

Related U.S. Application Data

(63) Continuation-in-part of application No. 08/983,216, filed as application No. PCT/NO96/00175 on Jul. 11, 1996, now Pat. No. 6,019,057.

(51) Int. Cl.[7] .............................................. B63B 21/08
(52) U.S. Cl. ....................................................... 114/199
(58) Field of Search ................................ 114/199, 200, 114/210, 218, 230, 293

(56) References Cited

U.S. PATENT DOCUMENTS 4,423,697 A * 1/1984 Royset ........................ 114/199
4,458,631 A * 7/1984 Hystad ........................ 114/199
6,019,057 A * 2/2000 Hystad ........................ 114/199

* cited by examiner

Primary Examiner—Ed Swinehart
(74) Attorney, Agent, or Firm—Dorsey & Whitney LLP

(57) ABSTRACT

A device stops and retains a clamp on a wire. The device is mounted above a surface, which is preferably a deck of a vessel. The device comprises a fork that can engage with the clamp. The fork has a pair of teeth defining an opening therebetween, and the opening has a bottom. The fork has a first effective locking height defined between the bottom and the surface and height intended for retaining a wire lying within a first size range. The fork also has a second effective locking height defined above the surface and intended for retaining a wire lying within a second size range which is smaller than said first size range. The second locking height is greater than the first locking height, relative to the surface. The fork includes at least one guide member for mounting and securing an insert, preferably U-shaped, in the opening between the fork teeth, said insert having a bottom defining said second locking height. Optionally, the fork teeth have holes through which a locking bolt can be inserted. Preferably, the clamp comprises one or more wedges secured to the wire, such as a wedge having a vertical profile in the shape of a triangle or a wedge having a vertical profile in the shape of rectangular steps.

15 Claims, 7 Drawing Sheets

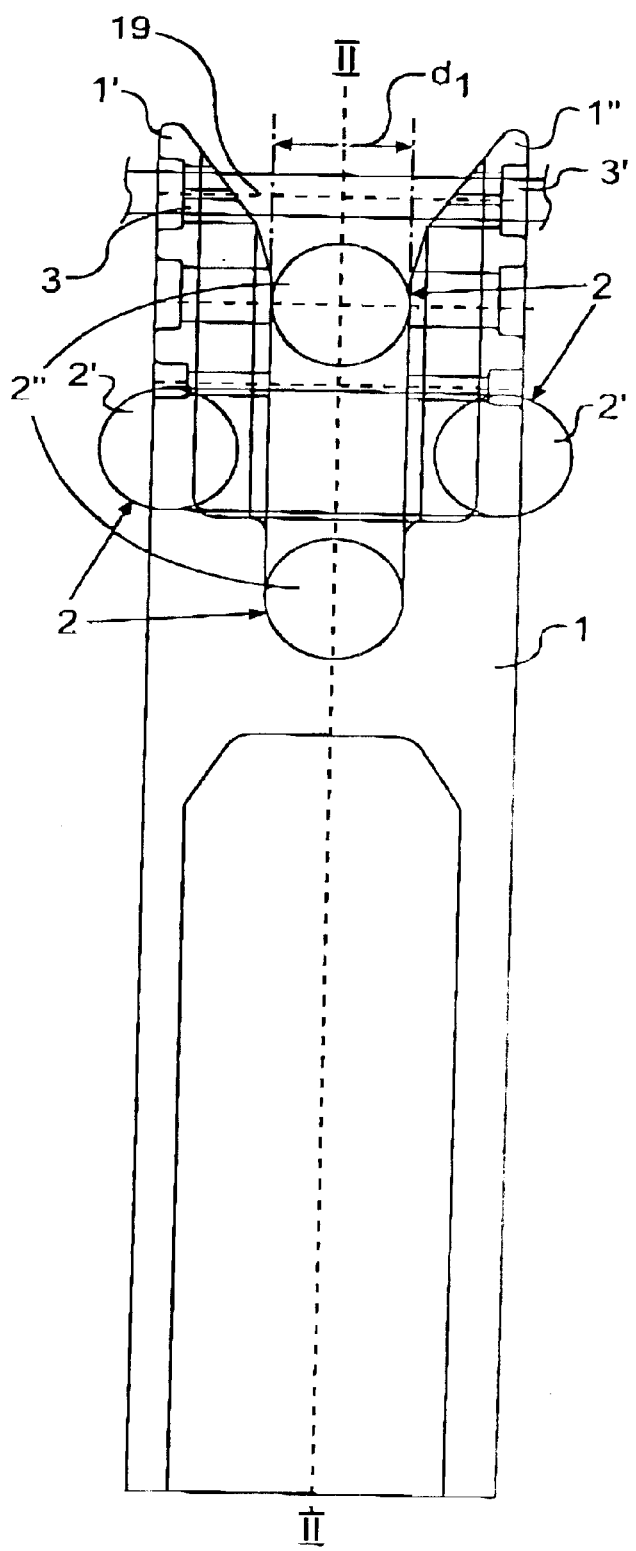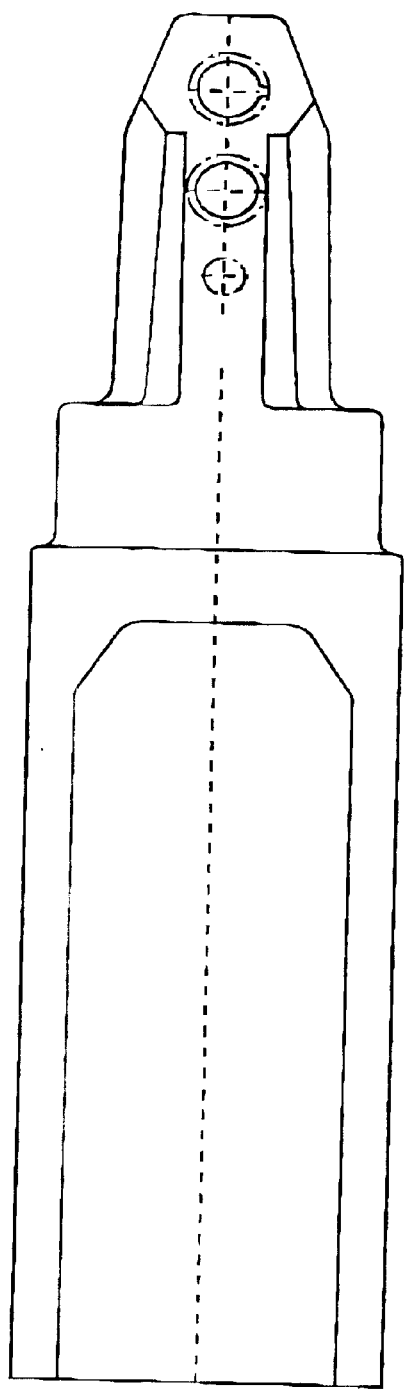
FIG. 1  FIG. 2

STOPPING AND RETAINING DEVICE FOR CHAIN OR WIRE

RELATED APPLICATIONS

This application is a continuation-in-part of U.S. application Ser. No. 08/983,216, filed Mar. 3, 1998, now U.S. Pat. No. 6,019,057, which claims the priority of PCT Application No. PCT/NO96/00175, filed Jul. 11, 1996 and Norwegian Application No. 952771, filed Jul. 12, 1995. All of the above-mentioned applications are incorporated herein by reference.

TECHNICAL FIELD

The invention generally relates to cable, chain or wire stoppers. More particularly, the invention relates to a device on board a vessel for stopping and retaining either a link in a chain or a clamp on a wire, where the chain or wire is intended to extend stretched between the vessel and, e.g., an anchor, an offshore platform or another vessel.

BACKGROUND ART

A device of the type introduced above is known from, for example, Danish Patent No. 260004. A somewhat more comprehensive variant of this known device is apparent from Norwegian Patent No. 152641.

Recently, however, a need has arisen for stopping and retaining devices capable of handling chain or wire having a diameter in the range of up to about 170 mm. The same stoppers must also be utilizable for chain or wire of a dimension down to about 50 mm. For this to be possible, such a device must not have too large a diameter, as a chain of small dimensions would otherwise risk being drawn down into the guide tube conduit of the stopping device. It is thus important that the distance between the teeth of the grip and stop fork be correctly gauged, and that the depth of the opening between the teeth be great enough to allow space for a chain having a diameter of 170 mm, and also that there be sufficient space for a locking bolt at the free end of the fork teeth.

SUMMARY OF THE INVENTION

In one respect, the present invention is a device for stopping and retaining a clamp on a wire. The device is mounted above a surface, which is preferably a deck of a vessel. The device comprises a fork that can engage with the clamp. The fork has a pair of teeth defining an opening therebetween, and the opening has a bottom. The fork has a first effective locking height defined between the bottom and the surface and height intended for retaining a wire lying within a first size range. The fork also has a second effective locking height defined above the surface and intended for retaining a wire lying within a second size range which is smaller than said first size range. The second locking height is greater than the first locking height, relative to the surface. The fork includes at least one guide member for mounting and securing an insert, preferably U-shaped, in the opening between the fork teeth, said insert having a bottom defining said second locking height. Optionally, the fork teeth have holes through which a locking bolt can be inserted. Preferably, the clamp comprises one or more wedges secured to the wire, such as a wedge having a vertical profile in the shape of a triangle or a wedge having a vertical profile in the shape of rectangular steps.

Certain embodiments of the invention are capable of stopping and retaining wire having a diameter in multiple size ranges, with a single device. These and other advantages and benefits of the invention will be apparent upon reading the below detailed description of a preferred embodiment of the invention, with reference to the enclosed drawings.

BRIEF DESCRIPTION OF DRAWINGS

FIG. 1 is a schematic elevational view of a device according to the invention.

FIG. 2 is a view of the device of FIG. 1 along the line II—II.

DETAILED DESCRIPTION OF A PREFERRED EMBODIMENT

Figures 3, 4:
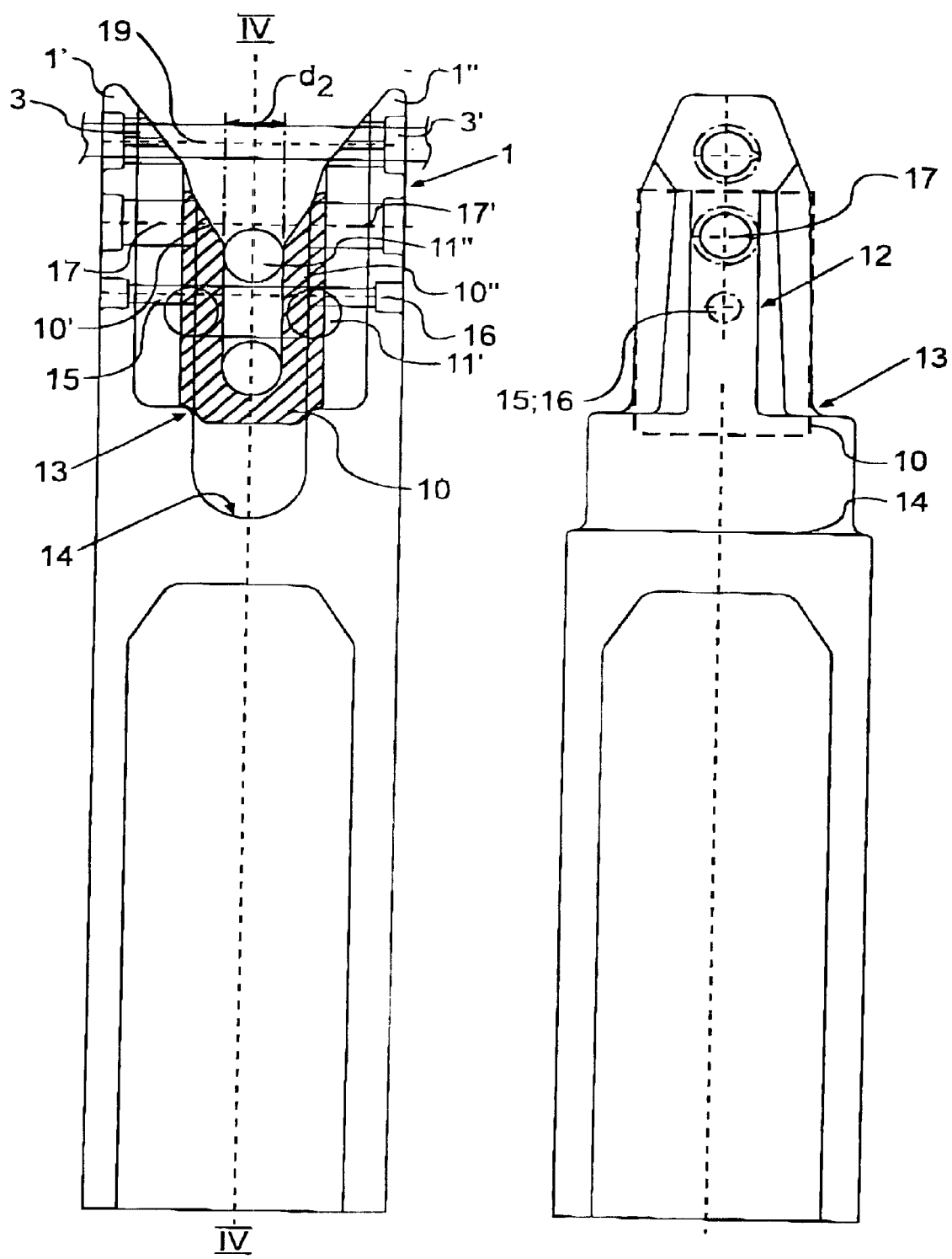
FIG. 3 shows the device of FIG. 1 with a U-shaped insert piece.
FIG. 4 is a view of the device of FIG. 3 along the line IV—IV.

In FIG. 1 is shown a grip and stop fork 1, with a chain 2 positioned in a fork 1, where the chain has a diameter of about 170 mm, so that the distance $d_1$ between the fork teeth 1' and 1" is equal to or slightly greater than the maximum diameter of the chain. The fork 1 is designed so that the horizontal chain link, as indicated by reference numeral 2' in FIGS. 5 and 6, rests against the fork 1. The horizontal chain link 2' is prevented from twisting, inasmuch as the adjacent vertical chain link 2" is situated in the opening between fork teeth 1' and 1". The supported, vertically situated chain link 2" thus ensures that the horizontal chain link 2' is unable to twist to one side or the other about its longitudinal axis.

The grip and stop fork 1 is, at the outset, constructed such that chains of a diameter in the range of 110 mm–170 mm will be stopped directly against the fork 1 without any U-shaped insert piece having been placed therein, and at a lower height $h_1$, above the vessel deck than what would be the case for chain or wire dimensions smaller than 110 mm.

Although it is described that the device of FIGS. 1 and 2 would be applicable for chains in the dimensional range of 110 mm–170 mm, it will be immediately understood that the invention cannot be considered to be limited to this chain dimension, as the use with chains of larger dimension, or optionally a slightly smaller would also be conceivable within the scope of the range of invention.

When the vertical chain link 2" is situated between the fork teeth 1' and 1", it may optionally be advantageous to ensure that the chain link 2" does not move out of the fork 1. For this purpose, holes 3 and 3' are provided in the fork teeth 1' and 1" at the respective outer ends thereof for the insertion of a locking bolt 19.

Figure 5:
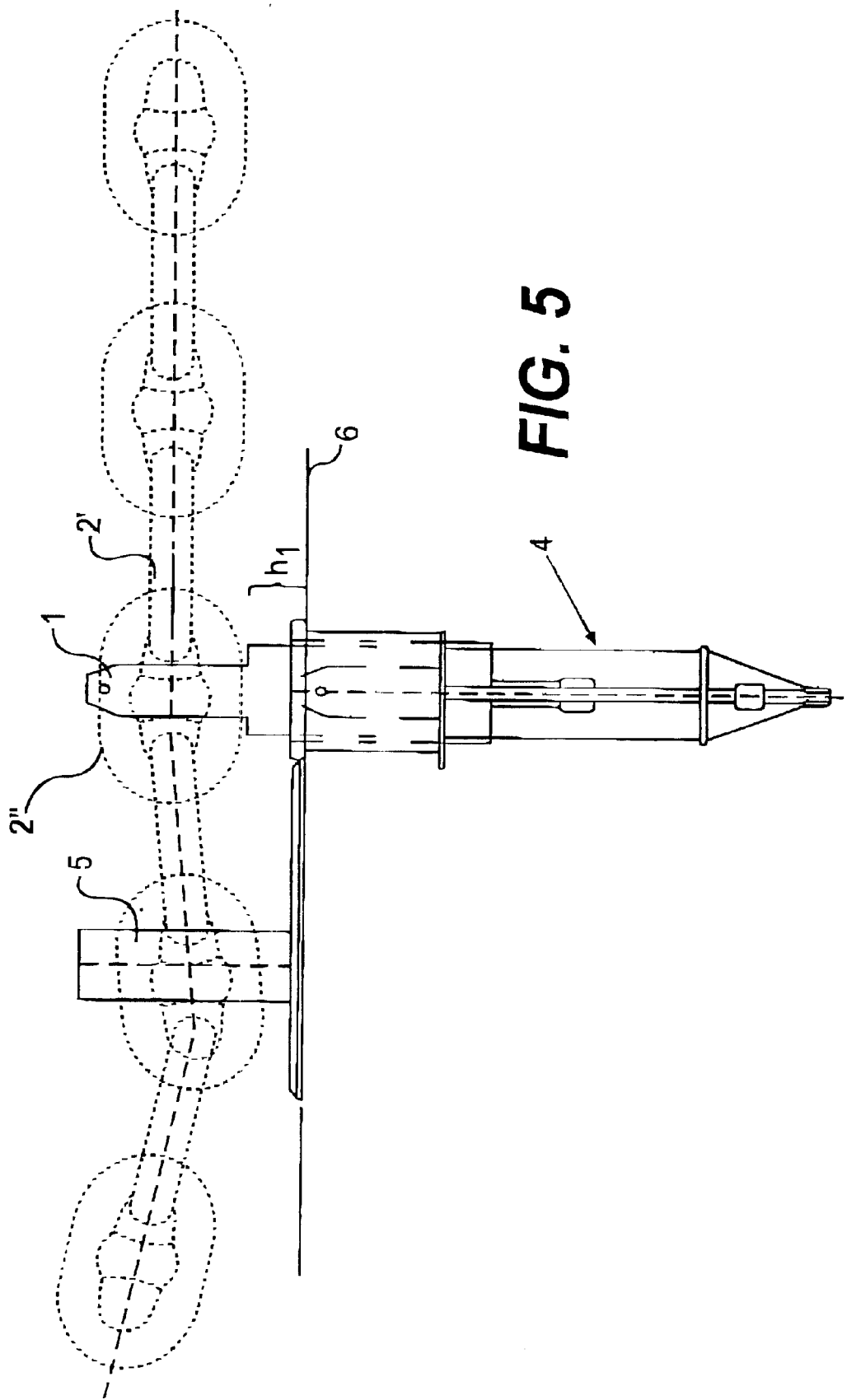
FIG. 5 shows the device of FIG. 1 being used with a chain of large dimension and employing one type of towing pins.

In the embodiment in FIG. 5, the device of FIGS. 1 and 2 has been provided with raising and lowering capability in a vertical direction by means of a lifting mechanism 4, e.g., of the hydraulic type or of the nut/screw type. Together with the device of FIGS. 1 and 2, the embodiment of FIG. 5 is shown being used with a pair of known per se towing pins 5 arranged in a stationary position on the vessel deck.

Figure 6:
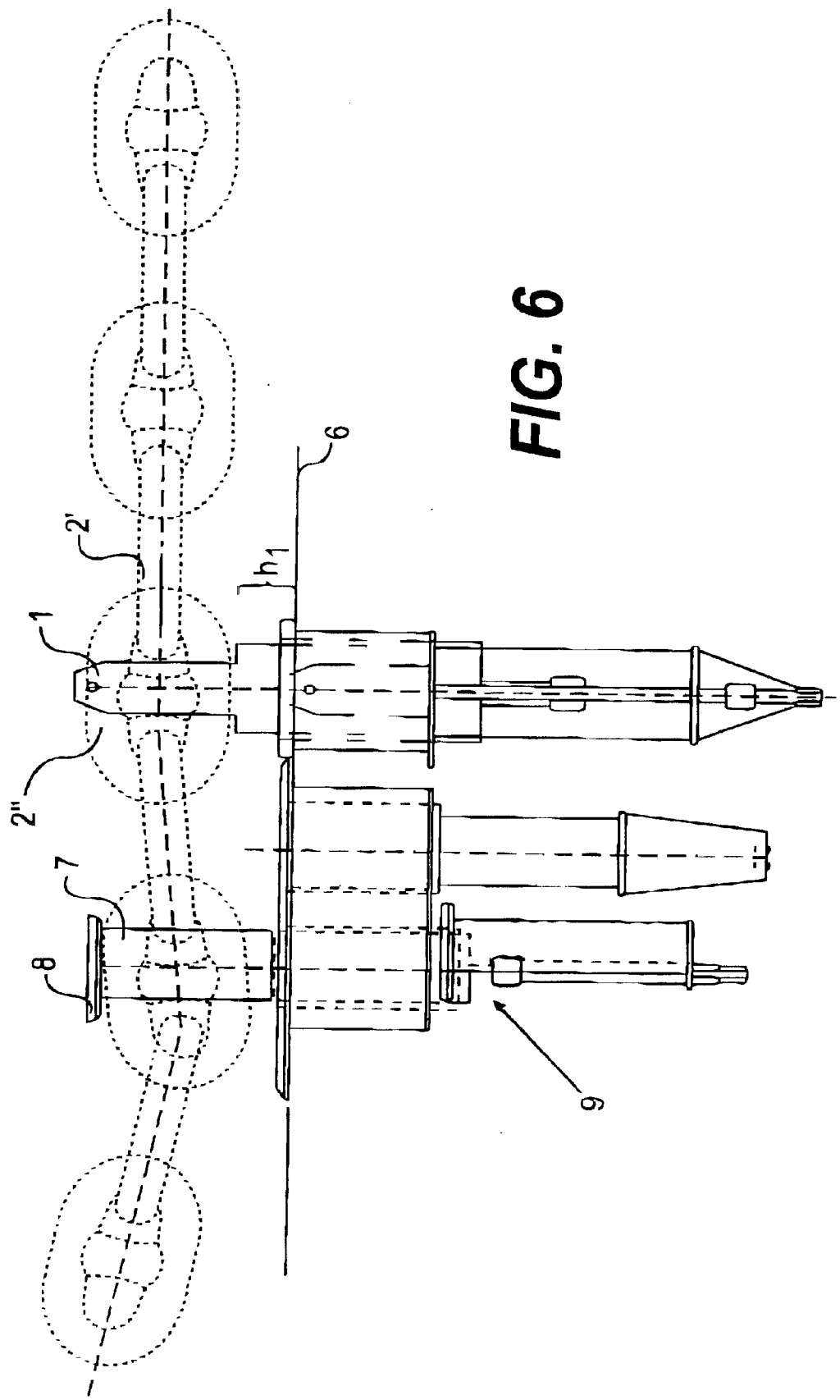
FIG. 6 shows a variant of FIG. 5, wherein the device of FIG. 1 employs a second type of towing pins.

In an alternative embodiment shown in FIG. 6, the towing pins are designated by reference numeral 7 and are designed as towing pins having raising and lowering capability and are equipped with locking members 8, or so-called "flaps," which rotate toward one another in order to lie over the opening between towing pins 7 when they are in their uppermost position. The towing pins 7 is provided with a raising and lowering mechanism 9 which causes the towing pins 7 to rotate at the same time as the towing pins 7 are raised or lowered. Such a raising and lowering mechanism as well as towing pins of this type having locking members are known per se. Said locking members or "flaps" 8 also prevent the chain from being drawn up over the towing pins 7.

The device of FIGS. 1 and 2 will now be explained in more detail with reference to FIGS. 3, 4 and 7. This solution is intended to be used for a chain of a smaller dimension, e.g., in the range of 50 mm–105 mm, or optionally for wire having a diameter of up to 140 mm. The stated dimensional ranges, however, should be regarded merely as guidelines and should not be perceived as a limitation to the scope of the invention.

As shown in FIG. 3, with the use of the device according to the invention and, a chain having the slightly smaller dimension in the range of, e.g., 50 mm–105 mm, it will be necessary to employ a U-shaped insert piece 10, indicated by the shaded area in FIG. 3 and by a heavy broken line in FIG. 4. If the insert piece 10 should optionally be used in connection with a wire, it would be possible to employ somewhat thinner walls on the insert piece 10, allowing the dimension of the wire to be as great as 140 mm.

Figure 7:
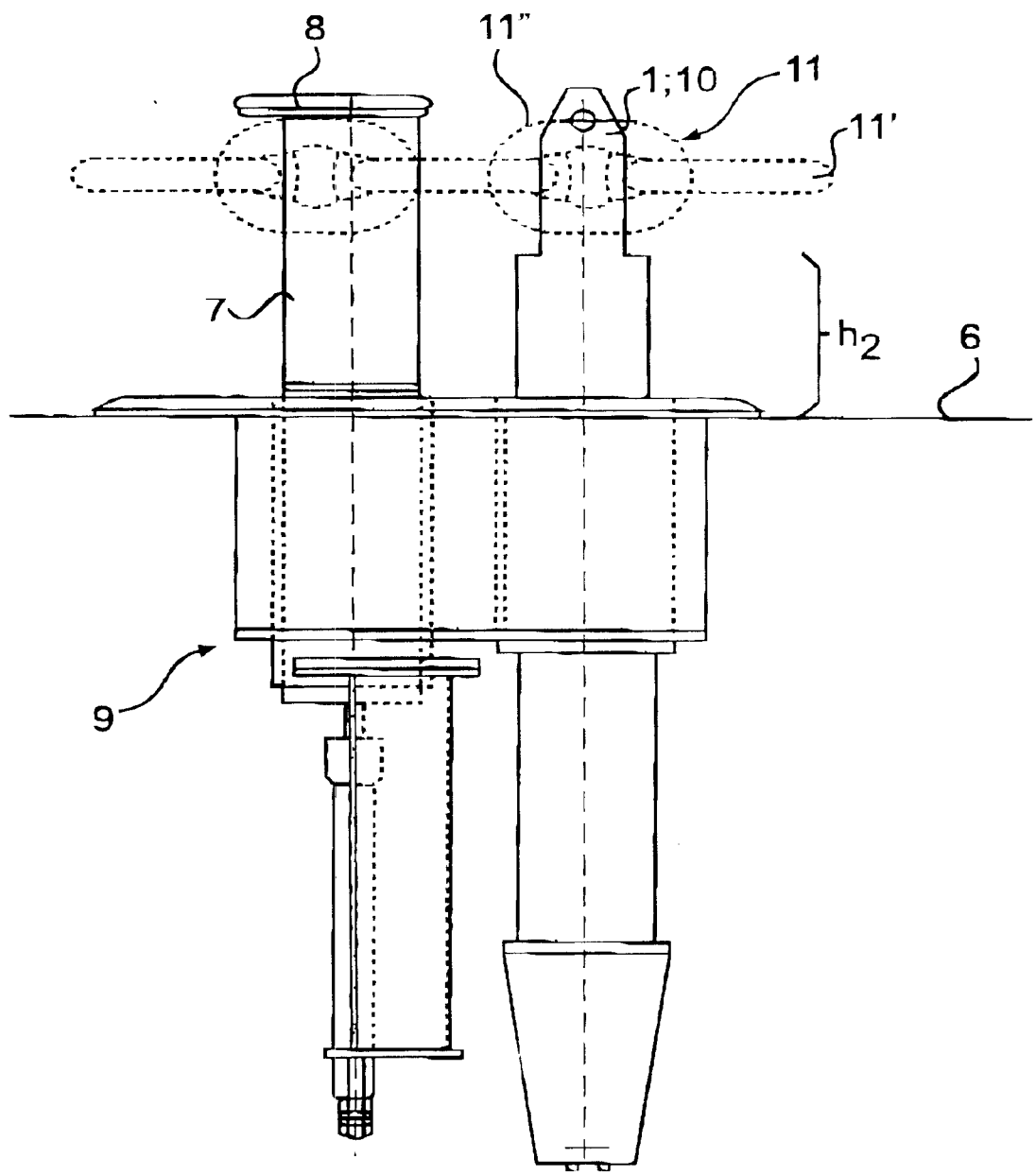
FIG. 7 shows the device of FIG. 1 used with a U-shaped insert piece for smaller dimensions of chain.

As will be clearly apparent from FIG. 7, the bottom of the U-shaped insert piece 10 is situated at a locking height $h_2$ above the vessel deck 6. The chain 11 or wire (not shown) within this range having smaller dimensions is consequently lifted higher up over the deck, which must be regarded as a great advantage during normal anchor handling. It is particularly advantageous to use the device according to the invention equipped with the U-shaped insert piece 10, in connection with a towing pin arrangement 7, 8 and 9, as shown and described in connection with FIG. 6. The locking members or said "flaps" 8 on the towing pins 7 is closed over the wire or chain during, e.g., anchor handling. This prevents the wire or chain 11 from being drawn up from the device according to the invention, which could normally extend about 18–20 cm up above said locking members 8, as is indicated by the top part of FIG. 7.

As shown and explained in connection with FIGS. 5 and 6, the horizontal chain link 11' rests against the fork 1 and its insert piece 10. The vertical chain link or loop 11" is situated between the arms of said U-shaped insert piece 10, as indicated by FIG. 3. This allows the horizontal chain link 11' to twist to a considerable degree, since it is well supported against both the fork 1 and its insert piece 10, as well as the vertical chain member 11".

The U-shaped insert piece 10 engages with guide members 12 on fork 1, and these guide members 12, as indicated by FIG. 4., are tapered in the direction away from a shoulder 13 situated above a bottom 14 of the fork opening.

To hold the U-shaped insert piece 10 in place, mounting holes 15 and 16 are provided in each of the fork teeth 1' and 1", into which holes may be inserted fixing screws (not shown) which optionally may threadably engage with the insert piece 10.

Further, the teeth 1' and 1" on the fork 1 may be provided with axially arranged holes 17 and 17' for cooperation with an optional locking bolt 19 to prevent a chain or wire from moving completely out of the insert piece 10.

The distance between the two branches 10' and 10" on the U-shaped insert piece 10 is designated by $d_2$ and corresponds to the largest dimension within the second, lower dimensional range for said chain or wire.

The present device may be constructed with a horizontal cross-sectional dimension that is relatively small, e.g., in the range of about 45–50 cm.

The device according to the invention thus displays the advantage of permitting two locking heights above the vessel deck 6, where the first locking height above the deck is provided by using a U-shaped insert piece to lock a chain or wire with a diameter in the range of, e.g., 50–105 mm, or a specially designed U-shaped insert for only wire having a dimension of up to about 140 mm. The lowest locking height above the vessel deck permits the locking of a chain having a diameter in the range of about 110–180 mm.

When a chain of large diameter is locked to the fork 1, the shortest possible momentum arm for the forces is exerted on the fork 1. Moreover, the resistance momentum for the fork 1 for the cross-section that is under most stress in this instance is maximal.

With a chain or wire of a diameter in the range of, e.g., 50–105 mm (alternatively up to 140 mm), there is provided an upper locking bed having a locking height of $h_2$. The previously mentioned U-shaped insert 10 is mounted in an upper part of the fork 1. This thereby provides a greater locking height above the vessel deck 6, which is a major advantage in regular anchor handling with chain or wire dimensions within the relevant range.

The U-shaped insert 10 is constructed so that there is little clearance, preferably maximum 10 mm, between it and the vertical chain link 11" that is supported by means of the horizontal chain loop or link 11'. The forces that seek to burst the fork 1 are thereby reduced by a considerable degree.

Figure 8:
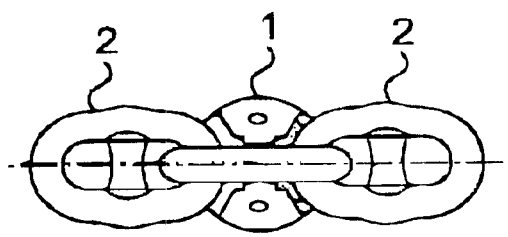
FIG. 8 illustrates a top view of FIG. 1.

FIG. 8 shows a top view of the grip and stop fork 1 with the chain 2 positioned in the grip and stop fork 1.

Figure 9:
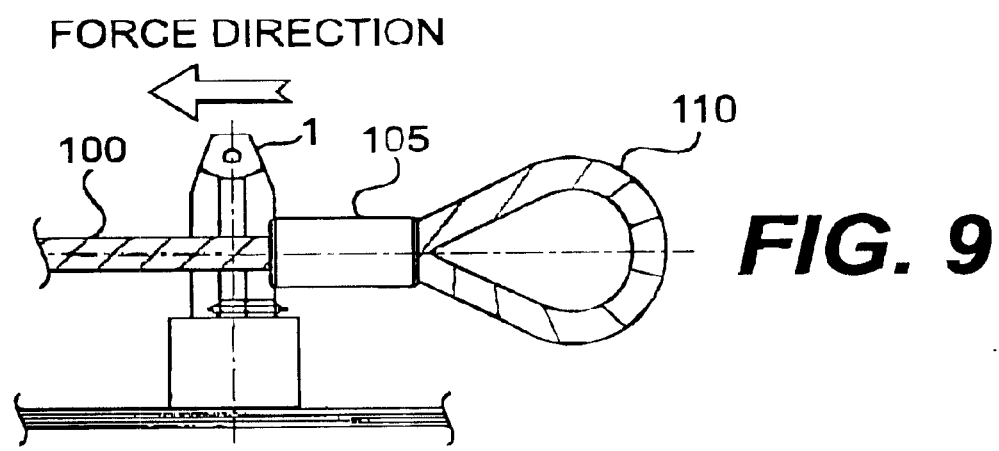
FIG. 9 illustrates an elevational view of a second embodiment of the present device.
Figure 10:
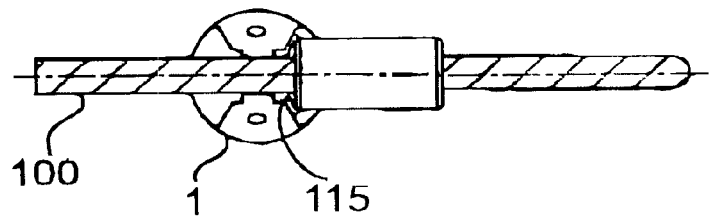
FIG. 10 illustrates a top view of FIG. 9.

FIG. 9 shows another embodiment of the grip and stop fork 1. The grip and stop fork 1 includes a wire 100 which goes through the fork 1. One end of the wire 100 forms a wire loop 110. The wire loop 110 is formed by adding a wire clamp 105 to that end of the wire 100. FIG. 10 illustrates a top view of FIG. 9. The grip and stop fork 1 includes an U-shaped insert 115. The clamp 105 is engageable with a mouth of the fork opening and the insert 115.

Figures 11, 12:
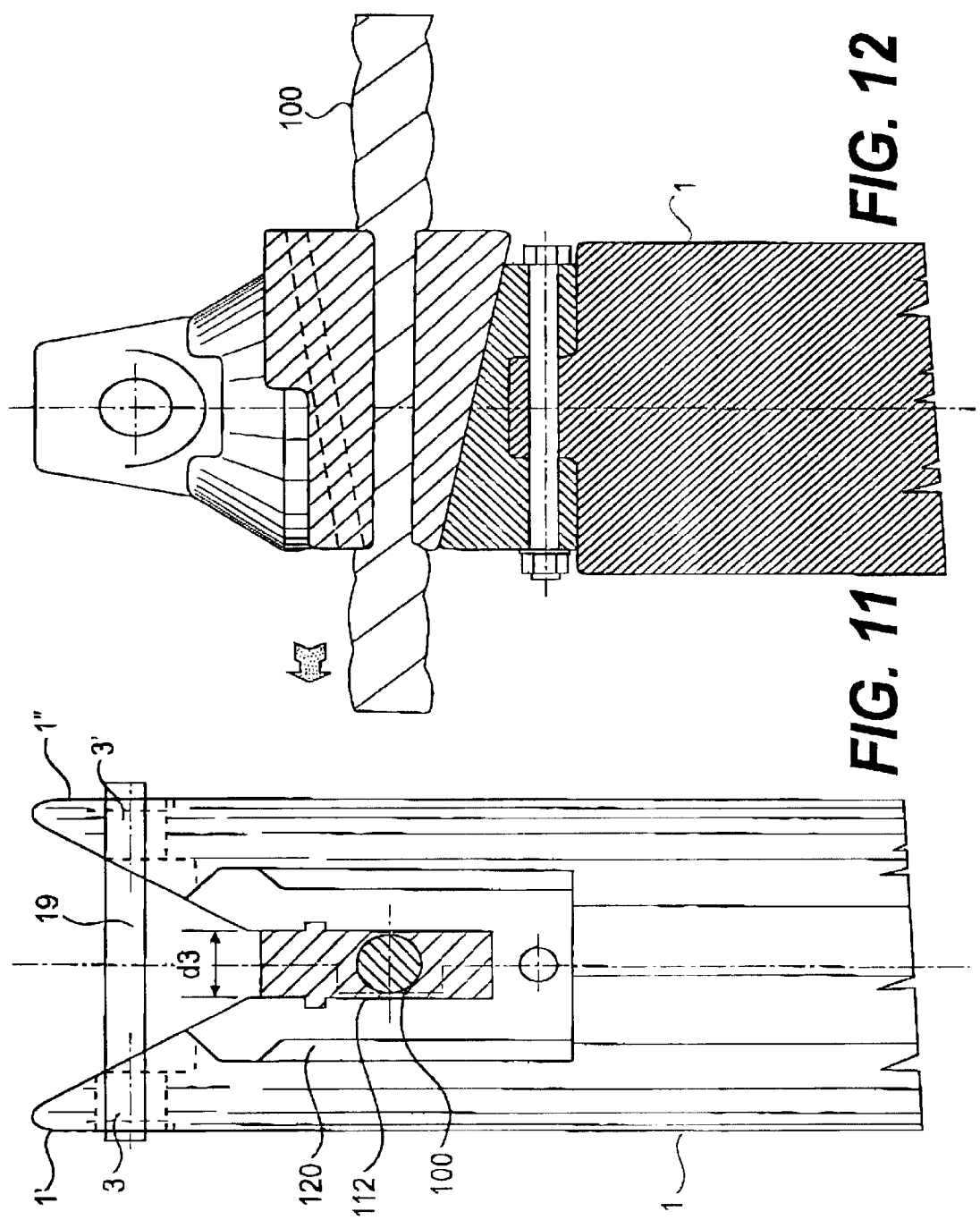
FIG. 11 illustrates an elevational view of a third embodiment of the present device.
FIG. 12 illustrates a top view of FIG. 11.

FIG. 11 shows yet another embodiment of the grip and stop fork 1. This embodiment also includes the wire 100. The wire 100 is located in the opening between the fork teeth 1' and 1". The holes 3 and 3' are also provided in the fork teeth at the respective outer ends for insertion of a locking bolt. The grip and stop fork 1 includes a U-shaped insert 120. The fork 1 also includes wedges 112 which form the wire clamp 105. The width of the U-shaped insert 120 is at a distance of $d_3$. FIG. 12 shows a side view of FIG. 11. In particular, FIG. 12 illustrates the wire grooves in the upper wedge of the U-shaped insert 120 in the wire 100. The lower wedge is shown having a vertical longitudinal profile in the shape of a triangle. The upper wedge is shown having a vertical longitudinal profile in the shape of rectangular steps.

These shapes are exemplary; other shapes are possible. The embodiment illustrated in FIGS. 11 and 12 can be utilized in conjunction with a pair of towing pins, such as the towing pins 5 (FIG. 5) or the towing pins 7 (FIG. 7), secured to the vessel deck 6 in a horizontal spaced away relation from the fork 1, wherein the wire 100 extends through the space between the towing pins.

The terms and descriptions used herein are set forth by way of illustration only and are not meant as limitations. Those skilled in the art will recognize that numerous variations are possible within the spirit and scope of the invention as defined in the following claims, in which all terms are intended in their broadest sense, and their equivalents.

What is claimed is:

1. A device for stopping and retaining a clamp on a wire, wherein the device is mounted above a surface, the device comprising:
    a fork having a pair of teeth defining an opening therebetween, the opening having a bottom, and wherein the fork opening can engage with the clamp;
    the fork having a first effective locking height defined between the bottom and the surface, the first effective locking height intended for retaining a wire lying within a first size range;
    the fork having a second effective locking height defined above the surface, the second effective locking height intended for retaining a wire lying within a second size range which is smaller than said first size range;
    wherein the second locking height is greater than the first locking height, relative to the surface; and
    wherein the fork includes at least one guide member for mounting and securing an insert in the opening between the fork teeth, said insert having a bottom defining said second locking height.

2. The device of claim 1 wherein the device is mounted on a vessel, and the surface is a deck of the vessel.

3. The device of claim 2 wherein the wire is intended to extend between the vessel and a wire terminal selected from the group consisting of: an anchor, an offshore platform, and another vessel.

4. The device of claim 1 further comprising:
    a lifting mechanism, such that the device may be raised or lowered in relation to the surface.

5. The device of claim 1 wherein the insert is a U-shaped insert.

6. The device of claim 1 wherein the bottom of the insert is spaced at a distance above the bottom of said fork opening.

7. The device of claim 1 wherein the fork further includes a shoulder spaced at a distance above the bottom of the fork opening.

8. The device of claim 7 wherein the guide member is tapered in a direction away from said shoulder.

9. The device of claim 1, wherein the four teeth have holes axially arranged therein, whereby a lock and bolt can be inserted through both the fork teeth holes.

10. The device of claim 1 further comprising:
    a pair of towing pins secured to the surface in a horizontal spaced away relation from the fork, wherein the wire extends through a space between the pair of towing pins.

11. The device of claim 11 wherein the clamp comprises one or more wedges.

12. The device of claim 11 wherein at least one of the one or more wedges has a vertical longitudinal profile in the shape of a triangle.

13. The device of claim 11 wherein at least one of the one or more wedges has a vertical longitudinal profile in the shape of rectangular steps.

14. The device of claim 11 wherein the clamp is locatable in the space between the pair of teeth.

15. The device of claim 1 wherein one end of the wire forms a wire loop by adding the clamp to that end of the wire, the clamp being engageable with a mouth of the fork opening and the insert relative to the clamp.

* * * * *